Figure 1:
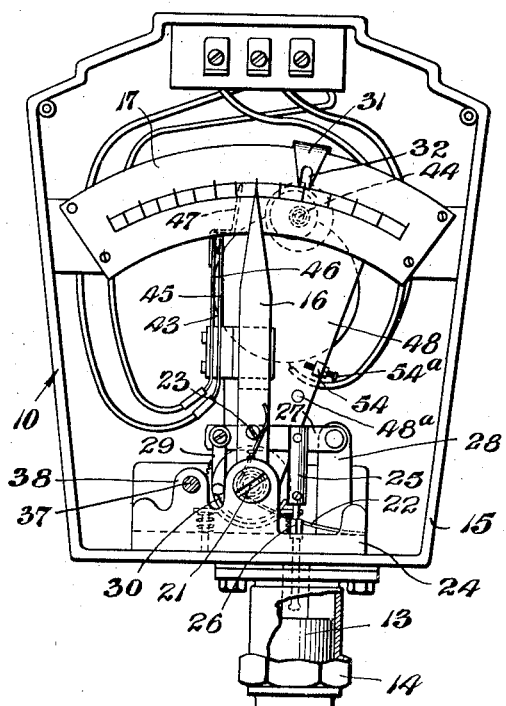

July 15, 1941.  J. K. CLARK  2,249,682
CONTROL SYSTEM
Filed April 29, 1940   2 Sheets-Sheet 1

Inventor
James K. Clark,
By Ruess & Geier
Attorneys

July 15, 1941.　　　J. K. CLARK　　　2,249,682
CONTROL SYSTEM
Filed April 29, 1940　　　2 Sheets-Sheet 2
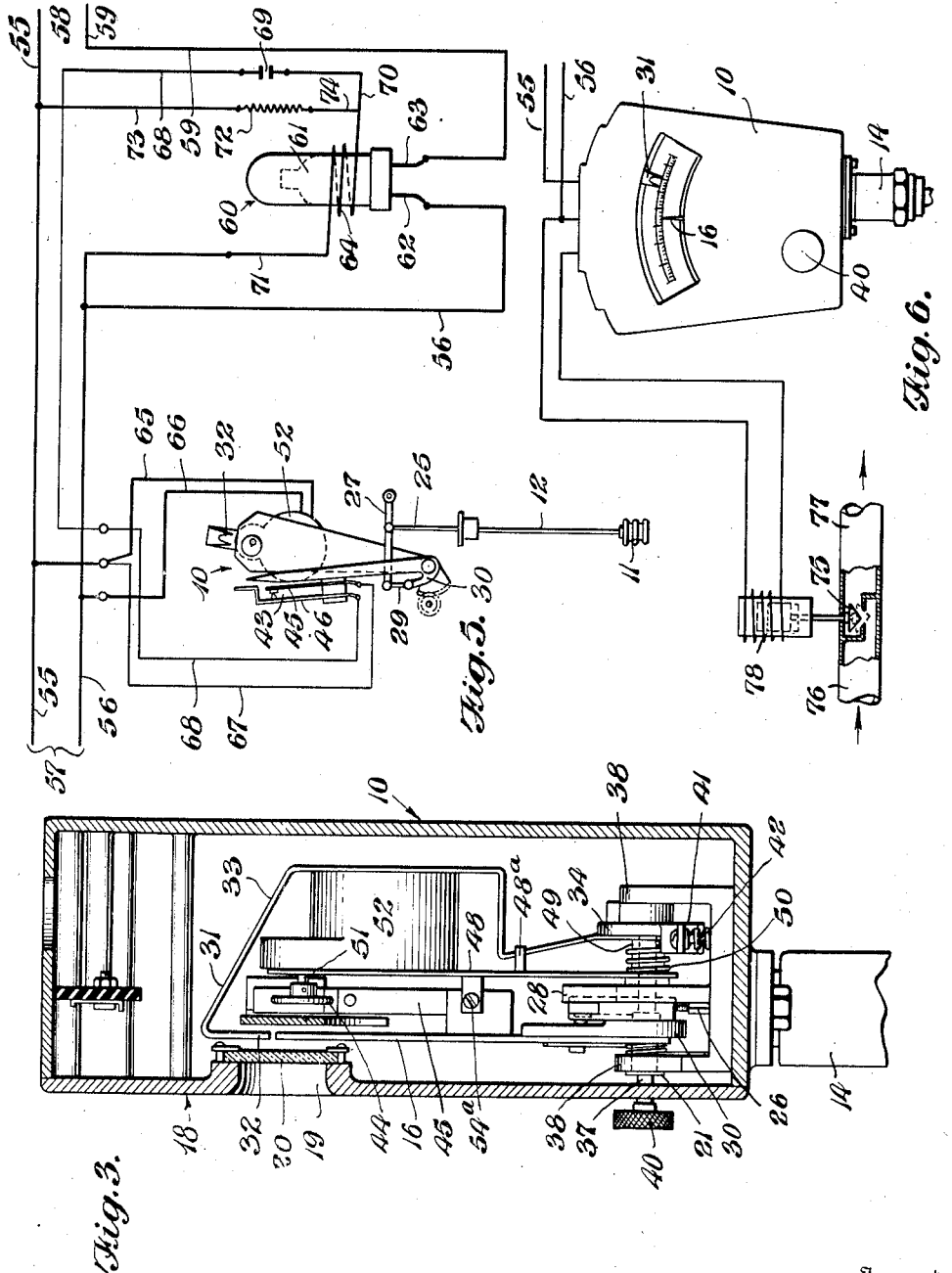
Inventor
James K. Clark Patented July 15, 1941

2,249,682

UNITED STATES PATENT OFFICE 2,249,682

CONTROL SYSTEM

James K. Clark, Utica, N. Y., assignor to The Partlow Corporation, New Hartford, N. Y.

Application April 29, 1940, Serial No. 332,339

7 Claims. (Cl. 236—46)

This invention relates to control systems and more particularly to a metering or like means for controlling and maintaining the conditions of the system constant within very close limits.

In accordance with this invention a metering control mechanism is provided wherein an indicator cooperates with a graduated scale to show the conditions of the system, the control meter being provided with a settable member cooperating with the scale at the point corresponding to the particular conditions in the system which it is desired to maintain constant. In cooperation with the indicator and settable member are a control circuit and circuit interrupter, the latter functioning when the indicator approaches the indication of the predetermined condition desired to be maintained, and in order that the conditions may be maintained within such very close limits, the circuit interrupter is cyclicly actuated to periodically interrupt the control circuit for periods of increasing magnitude as the indicator approaches the indication of the condition determined by the position of the settable member. The maximum of the magnitude of interruption of the circuit is adjustable whereby the control may be adjusted in accordance with the load on the system when desirable.

While the invention is subject to general application for controlling loads such as electrical loads, pressures, fluid flow and the like I have disclosed same applied in a control system for regulating temperatures, wherein the control is applied to the regulation of the flow of heating fluid, and preferably for regulating electric current employed as the heating medium.

The operation is such that the heat supplied to the device being controlled, is modulated or controlled in such a manner that a change in temperature within a preselected band or zone of control will produce a corresponding change in the rate that heat is supplied. That is to say, the rate of heat being supplied the device is a function of the temperature within a preselected band or zone of control. This is somewhat analogous to the control of water level in a tank by means of a float and valve. If water is allowed to drain from the tank, the float will drop a small amount and allow water to enter at the top at the same rate that is being drawn from the bottom. If a slightly greater amount is drawn the float will drop slightly and increase the rate of the water flowing in until the two are again in balance. The band or zone of control above mentioned would be the difference in the tank level between the all "on" and the all "off" positions of the valve, since no control would be exercised beyond these points in either direction.

The operation of the present temperature control system, in the case of electric heat, is by automatic means to periodically start and stop the flow of current in such sequence that the proportion of time between the time the current is on to the time it is off is such as to just satisfy the requirement for heat. If the temperature should drop slightly, the control will cause the current to remain on slightly longer in each impulse and the "off" period will be shortened an equal amount. The frequency of the on and off cycle is so chosen that there will be no perceptible drop in temperature between successive "on" impulses. There will be sufficient thermal inertia in the heater and its load to smooth out any tendency for a temperature "ripple" due to the periodic starting and stopping of the heat supply.

Further objects, details, and advantages of the invention will be more fully set forth in the following specification of a control system for regulating temperatures in conjunction with the accompanying drawings and claims hereinafter.

Figure 2:
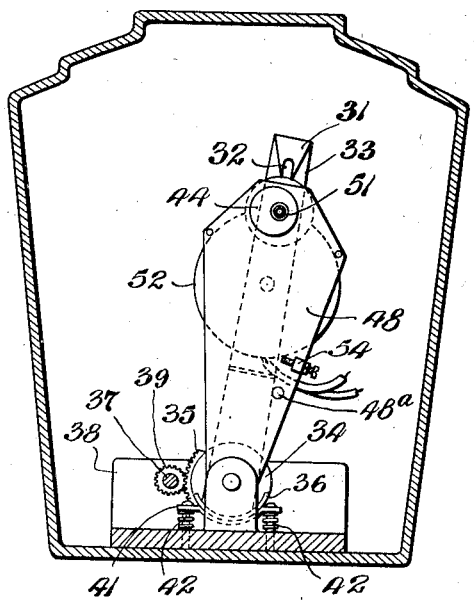
Figure 4:
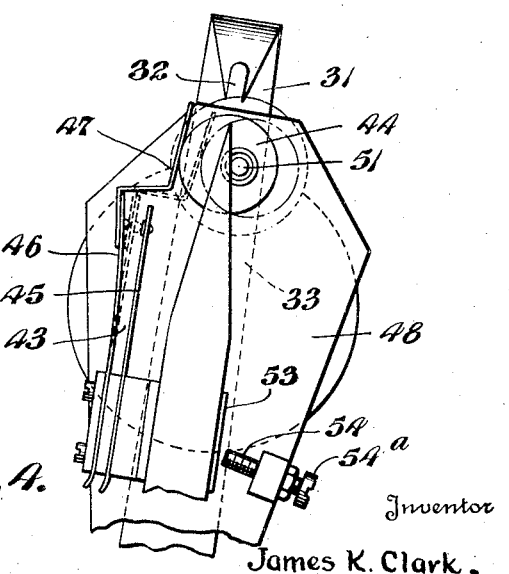

In the drawings:

Fig. 1 is a front elevation view of an indicating and controlling meter for temperature regulation in a control system in accordance with my invention with the front cover thereof removed, Fig. 2 is an intermediate vertical sectional view thereof, certain of the elements toward the rear being shown in front elevation, Fig. 3 is a vertical side sectional view thereof, showing elements in side elevation, Fig. 4 is an enlarged detail front elevational view illustrating the meter control elements of the system in cooperative relationship, Fig. 5 is a diagrammatic view illustrating the control circuits for the control system, Fig. 6 is a diagrammatic view illustrating the control system applied to the control of fluid fuel as the heating medium in a temperature regulator system in accordance with my invention.

Referring to the drawings, as best shown in Fig. 1, the system includes a control meter 10, connected with an expansible type of thermal element 11, which is adapted to be positioned in a receptacle or the like, heated by a fluid fuel or an electric heating element and wherein the temperature is to be maintained at a predetermined constant temperature. This thermal element 11 communicates by way of a conducting element 12 to a diaphragm or plunger 13 in a cylinder or receptacle 14 on the bottom of the meter casing 15 and the elevation of the upper end of plunger 13 is variable by the pressure medium or the like as afforded by the thermally expansive fluid in element 11, which moves in accordance with the temperature being measured. This movement of plunger 13 is transferred to an indicator 16, which cooperates with a scale 17 graduated to indicate temperatures within the receptacle, that is, functions of the pressure or expansion of the expansive fluid or other medium in the thermostatically operating elements.

The control meter 10, as shown in Figs. 1 and 3 has its casing 15 of suitable formation for housing the indicating and control elements and is provided with a front cover 18 (Fig. 3) secured to the housing part in which the elements are mounted in a manner so that it may be removed in order to adjust elements when required. Cover 18, has a sight opening 19, for viewing the indications on the temperature scale 17 and a transparent cover 20 provides a closure for this opening.

As shown, indicator 16 is mounted to swing about an axis 21, which is concentric with the temperature scale 17, and is yieldingly urged toward the left hand or lower end of the scale by means of a spring 22, coiled around its axis shaft with its ends cooperating with a screw or projection 23 on the lower portion of the indicator, and with the element supporting base member 24, which is suitably secured in the bottom of casing 15. The operating connection between plunger 13 and indicator 16 for swinging it for indications on scale 17 comprises a link element 25 having a longitudinally adjustable screw element 26 at its lower end for engagement with plunger 13 and having its upper end pivotally connected with a lever 27. Lever 27 is pivoted at one end to an upright 28 of base 24 and its outer end is pivoted to a link 29 which in turn is pivotally connected to an arm 30 extending laterally from the lower end of indicator 16. By means of this linkage operating means, vertical lineal movements of plunger 13 are multiplied and translated into oscillatory movement imparted to indicator 16, in a substantially constant ratio, and the position of the indicator thereby cooperates with scale 17 to indicate a function of the movement or positions of plunger 13 which are functions of temperatures being measured. It will be observed that adjustment of the indicator with respect to the thermally expansive elements may be obtained by changing the length of link 25 through adjustment of the longitudinally adjustable screw element 26, whereby the instrument may be properly calibrated.

Also cooperating with temperature scale 17 is a settable member 31, having an indicator 32 comprising a point or as shown a pair of spaced points defining an operating zone or band, which points or points are positionable along the graduations of scale 17. A rearwardly and downwardly extending arm 33 of settable member 31 is journaled on a shaft centered with respect to axis 21 referred to heretofore. This mounting of arm 33 includes a hub member 34 having a gear sector 35 and a brake drum sector 36. An operating shaft 37, journaled in bearing uprights 38 extending from base 24, is provided at its inner end with a pinion gear 39 meshing with gear sector 35, and its outer end extends through an opening in the housing cover 18, where it is provided with a handle 40 for manually turning the shaft to swing the settable member to any desired position with respect to graduated scale 17.

Cooperating with brake drum sector 36 is a brake shoe 41 which is pressed into engagement with sector 36 by means of springs surrounding studs 42 extending from base 24, which frictional means prevents movement of the settable member except by manual operation of operating shaft 37.

Cooperating with indicator 16 and settable member 31 is a switch 43 and a switch opening member 44. Switch 43 is preferably carried by indicator 16, and conveniently consists of switch contact carrying blades 45 and 46, the latter having an extension 47 which is adapted to be engaged by opening member 44, for separating the switch contacts for opening a control circuit of the control system as will be hereinafter described.

Switch opening member 44 is carried by an arm 48 in the form of a mounting plate, the lower end of which is secured to a hub 49 journaled on the shaft having center axis 21, so that its swinging movements are concentric with respect to movements of indicator 16 and the arm of the settable member 31. A spring 50 coiled about hub 49 tends to swing arms 48 to the left in the same manner spring 22 operates on indicator 16 but this arm 48 is provided with a rearward projection 48a, which normally engages arm 33 of settable member 31 for properly positioning the arm 48, with switch opening member 44, with respect to the settable member for the required cooperation with switch 43 as indicator 16 approaches the graduation point or zone of scale 17 on which settable member 31 is positioned.

Switch opening member 44 comprises a substantially circular cam eccentrically mounted on a rotary shaft 51 of an actuator 52, which comprises a small motor (conveniently of the self-starting alternating clock type wherein the drive shaft has a speed of 1 R. P. M.) mounted on the back of the mounting plate or arm 48 and is operable to drive the cam or opening member 44 at a uniform speed. This actuator motor 52 is adapted for continuous operation when the system is in operation, or at least, whenever indicator 16 is in the vicinity of settable member 31.

In operation, it will be seen that as indicator 16 approaches settable member 31, extension 47, of switch 43, approaches the switch opening member and when it is close enough it is engaged thereby to open the switch contacts, first for a short period followed by periods of increasing duration during each cycle of the cam as the indicator continues to move toward the settable member. In a thermostatically controlled system, where a control by the operation of switch 43 effects a cutting off of the heat, the indicator will come to rest at a point in the operating zone determined by the settable member where the "on" period is just sufficient to supply heat energy to take care of heat losses in the system.

This movement of the temperature indicating hand toward the cam just described is in the sense of increasing temperature so that a reduction in the "on" interval of the cycle will tend to cause the temperature to drop by means later described. Conversely a movement of the temperature indicator 16 in the opposite sense, that is to say, a drop in temperature or a movement of the switch contacts in a direction away from the rotating cam 44, will in a like manner but reversed sense cause the contacts to remain on or contacted for a greater interval of the cycle and by said later described means to tend to produce an increase in the temperature. It will thus be readily seen that the period of time in which the contacts are closed in proportion to the cycle of one rotation of the cam is a function of the temperature and the instrument will tend to assume a point of balance. Any tendency for the temperature to drop will cause a slight increase in the heat supplied to cause the temperature to be restored toward the balance point and vice versa.

While the switch opening period may be increased so as to be a greater portion of each cycle of the actuator or cam or even the entire period, it is desirable that some energy be furnished to the system periodically, that is during each cycle of operation of the actuator. To accomplish this, indicator 16 is provided with a projection 53 which is engageable with a stop 54 carried by arm 48 whereby movement of indicator 16 with respect to the switch opening member 44 is limited and thereby the duration of the opening of the switch contacts for each actuation cycle of the opening member. Stop 54 includes an adjustable engagement screw 54ª whereby the opening period may be adjusted as desired, or as short as desired, depending on the load in the system, surges, and other factors. In case the indicator 16 should continue to move after engagement with stop 54, as may occur under certain circumstances arm 48 carrying switch opening member 44 is also moved thereby, as permitted by its yieldable engagement with the settable member arm 33. However, under normal operation the adjustment is such that this extra movement will not occur, and the desired control is maintained within very close limits.

While control of a heat supply by control meter 10 in a heat control system as referred to is applicable to a control valve for fluid fuels, it is preferably applied for controlling electric current employed as a heating medium, and Fig. 5 shows a suitable circuit arrangement for doing so. A source of electric power is supplied to the lines 55 and 56 at 57.

Lines 55 and 59 are connected with the heating element or load 58. Intermediate, the control meter 10 and a heavy current relay 60, diagrammatically represented, are connected with the lines for controlling the load current. A relay of the type shown in the patent to McKinney No. 2,142,522 has been found satisfactory in a control system requiring a moderate heating load current, and as diagrammatically shown includes switch circuit conductors 62 and 63, which when the circuit is closed therebetween, completes the circuit between lines 56 and 59 to which they are respectively connected and thereby current is applied to the load.

This relay 60, in general as diagrammatically illustrated, includes a cylindrical magnetic plunger 61 for displacing mercury, so as to close the circuit between terminals or electrodes 62 and 63 for completing the circuit between the line conductors 56 and 59. The relay also has an operating coil 64 for electromagnetically effecting the plunging of plunger 61 into the mercury to effect an elevation of the mercury for completing the circuit for carrying the load current required by an electric heating element of the thermally controlled system.

Control meter 10 operates to control the operation of relay 60. The electric circuits in this meter include conductors 65 and 66 connected with power lines 55 and 56 and with the switch actuator motor 52, whereby in the event it is a clock type of A. C. motor it is continuously operated at a synchronous speed as referred to heretofore. A relay operating control circuit also extends through this control meter and comprises a conductor 67 connected with power line 55 and blade 45 of switch 43 on indicator 16; thence the circuit continues through normally closed contacts of switch blades 45 and 46, switch blade 46 to conductor 68, through a condenser 69, conductor 70 energizing coil 64 of relay 60, to a branch conductor 71 of power line 56, whereby sufficient current is passed through the operating coil to effect the actuation of plunger 61 for closing the relay circuit.

It is to be noted that the circuit just described for operating relay 60 is such as to draw a very small current through the contacts of switch 43 in control meter 10, the condenser 69, materially lowering the current which would otherwise pass as is required to effect the operation of plunger 61 of relay 60. This is supplemented however by a circuit shunting the control circuit through the meter switch contacts, comprising a resistance 72 connected by conductor 73 with power line 55 and conductor 74 with conductor 70, whereby a small current which by itself is insufficient to operate relay plunger 61, is continuously flowing through operating coil 64, and when this is supplemented by current afforded by closing of contacts of switch 43 in control meter 10, the current in coil 64 is sufficient to effect the actuation of plunger 61. Conversely when the contacts of switch 43 are opened the current in relay operating coil 64 is reduced sufficiently to effect an immediate release of plunger 61 to break the circuit between electrodes 62 and 63 to completely cut off the current to the load or electric heating element.

In the automatic control of temperature where electric heat is used, heretofore it has been customary to cause the temperature control instrument to make and break the heating circuit as required, that is to say, when the temperature reached the control point, the heating current was completely cut off and when the temperature dropped sufficiently to operate the instrument contacts, the maximum heating current was again allowed to flow. Thus, altho a slight amount of additional heat be required to restore the temperature, the control operated to allow the maximum capacity of the heater to flow, thereby supplying more heat than was required and causing the temperature to rise to a point where the control again would cut it off. The thermal inertia of the heater and its load would therefore cause the temperature to continue to rise or overshoot at each cut-off of the cycle. Then, since the heat supply has been cut completely off the temperature would drop until the control instrument again closed its contacts to again supply heat. Again, the thermal inertia would act to allow the temperaure to continue to fall for a period after the heat supply had again been restored. Thus since a definite amount of rise and fall of temperature was required to operate the instrument contacts and because of the effects of thermal inertia just described, there was a constant rising and falling of temperature above and below an average control temperature.

By the present invention above described, this fluctuation is reduced to a minimum and in the case where the heat loss from the apparatus being controlled is constant there is practically no fluctuation of temperature, it being perceptible only by the most sensitive of instruments. This is due as explained above, to the fact that the rate heat is supplied to the apparatus is made a function of the degree of deviation of the temperature from the control point. Therefore the instrument will automatically tend to seek a point where the rate of heat lost or extracted from the apparatus under control, and to maintain this point until a change occurs in either of said rates.

Control meter 10 is also applicable to gaseous or liquid fuels, in which case an electrically operated valve 75 in the fuel line as shown in Fig. 6 is substituted for the electric heating unit in the system above described. When so arranged the gas or liquid would be periodically allowed to flow and to cease much in the same manner as the electric current was allowed to flow and cease above. As indicated fluid fuel may be supplied by pipe 76 to valve 75 and from there by pipe 77 to the burner. This valve is of the normally closed type but is shown in open position being retained thereby by solenoid operating means 78 the coil of which is connected in the control circuit of a control meter 10. In this control meter the switch contacts of the control circuit are arranged to remain closed until the indicator 16 moves adjacent to the settable member 31, whereupon the fuel control valve 75 is cyclicly operated as herein before set forth.

I do not wish to limit myself to any of the specific constructions or modes of operation described which are for purpose of giving examples or illustrations of employment of the invention, since it will be obvious that wide departure from the above may be made without departing from the spirit and scope of the invention set forth in the following claims.

What is claimed is:

1. In an electric control system, a graduated scale on which conditions of the system may be indicated, a settable member cooperating with the scale and movable with respect thereto to any predetermined stationary position along the scale, an indicator cooperating with the scale to indicate the condition in the system, means for moving the indicator along the scale in accordance with the conditions of the system, a circuit for controlling the conditions in the system including a switch carried by the indicator normally closed while the indicator is cooperating with the low side of the scale with respect to the predetermined condition of the system determined by the position of the settable member, a switch opening member associated with the settable member, and means for actuating said switch opening member so as to periodically open said switch when the indicator is adjacent to the settable member.

2. In an electric control system, a graduated scale on which conditions of the system may be indicated, a settable member cooperating with the scale and movable with respect thereto to any predetermined stationary position along the scale, an indicator cooperating with the scale to indicate the condition in the system, means for moving the indicator along the scale in accordance with the conditions of the system, a circuit for controlling the conditions in the system including a switch carried by the indicator normally closed while the indicator is cooperating with the low side of the scale with respect to the predetermined condition of the system determined by the position of the settable member, a switch opening member associated with the settable member, means for actuating said switch opening member so as to periodically open said switch when the indicator is adjacent to the settable member, and adjusting means cooperating between the switch opening member and indicator whereby the duration of the open periods of the switch during each cycle of operation of the switch actuating means may be determined.

3. In an electric control system, a graduated scale on which conditions of the system may be indicated, a settable member cooperating with the scale and movable with respect thereto to any predetermined stationary position along the scale, an indicator cooperating with the scale to indicate the condition in the system, means for moving the indicator along the scale in accordance with the condition of the system, a circuit for controlling the condition of the system including means operable by the indicator for varying said circuit in a manner to produce changes of greater or less relative magnitude to the system with respect to the predetermined condition of the system determined by the position of the settable member, a member engaging the settable member and movable therewith, a spring maintaining said member in engagement with the settable member in a manner to permit it to be moved away therefrom along the high side of the scale beyond the settable member in the event the indicator moves to the high side of the scale beyond the settable member, and means carried by said member for periodically varying said circuit so that the duration of the changes are functions of the indicator positions with respect to the settable member when adjacent to each other.

4. In an electric control system, a graduated scale on which conditions of the system may be indicated, a settable member cooperating with the scale and movable with respect thereto to any predetermined stationary position along the scale, an indicator cooperating with the scale to indicate the condition in the system, means for moving the indicator along the scale in accordance with this condition of the system, a circuit for controlling the conditions in the system including a switch carried by the indicator normally closed while the indicator is cooperating with the low side of the scale with respect to the predetermined condition of the system determined by the position of the settable member, a switch opening member yieldably engaging the settable member operable to open said switch when the indicator is adjacent to the settable member and adapted to be moved along the high side of the scale beyond the settable member in the event the indicator moves to the high side of the scale beyond the settable member, and means for actuating said switch opening member so as to periodically open said switch when the indicator is in a position for the switch opening member to cooperate with the switch.

5. In an electric control system, a graduated scale on which conditions of the system may be indicated, a settable member cooperating with the scale and movable with respect thereto to any predetermined stationary position along the scale, an indicator cooperating with the scale to indicate the condition in the system, means for moving the indicator along the scale in accordance with this condition of the system, a circuit for controlling the conditions in the system including a switch carried by the indicator normally closed while the indicator is cooperating with the low side of the scale with respect to the predetermined condition of the system determined by the position of the settable member, a switch opening member yieldably engaging the settable member operable to open said switch when the indicator is adjacent to the settable member and adapted to be moved along the high side of the scale beyond the settable member in the event the indicator moves to the high side of the scale beyond the settable member, means for actuating said switch opening member so as to periodically open said switch when the indicator is in a position for the switch opening member to cooperate with the switch, and adjusting means cooperating between the switch opening member and indicator whereby the duration of the open periods of the switch during each cycle of operation of the switch actuating means may be determined.

6. A control meter for an electric control system in accordance with claim 1, including a meter housing wherein the indicator, scale, settable member and switch opening member are mounted and housed, said switch opening member including an arm normally swingable with the settable member, a cam switch opening element carried by the arm, a motor carried by the arm for rotating said cam at a substantially constant speed, and actuating means connected with the meter for moving the indicator.

7. In an electric control system, a graduated scale on which conditions of the system may be indicated, a settable member cooperating with the scale and movable with respect thereto to any predetermined stationary position along the scale, an indicator cooperating with the scale to indicate the condition in the system, means for moving the indicator along the scale in accordance with the condition of the system, a circuit for controlling the condition of the system including means operable by the indicator for varying said circuit in a manner to produce changes of greater or lesser relative magnitude to the system with respect to the predetermined condition of the system determined by the position of the settable member, yieldable means engaging the settable member and movable therewith and adapted to be moved away therefrom along the high side of the scale beyond the settable member in the event the indicator moves to the high side of the scale beyond the settable member, and means carried by said yieldable means for periodically varying said circuit so that the duration of the changes are functions of the indicator positions with respect to the settable member when adjacent to each other.

JAMES K. CLARK.